(12) United States Patent
Yabata et al.

(10) Patent No.: US 6,325,526 B1
(45) Date of Patent: Dec. 4, 2001

(54) AUTOMOTIVE INTERNAL LIGHT

(75) Inventors: Hiroshi Yabata; Kouji Mikami, both of Tokyo (JP)

(73) Assignee: Kabushiki Kaisha T AN T (JP)

( * ) Notice: Subject to any disclaimer, the term of this patent is extended or adjusted under 35 U.S.C. 154(b) by 0 days.

(21) Appl. No.: 09/386,484

(22) Filed: Aug. 31, 1999

(30) Foreign Application Priority Data

Jun. 9, 1999 (JP) .................................................. 11-161945

(51) Int. Cl.$^7$ .................................................. H01R 33/00
(52) U.S. Cl. .......................... 362/488; 362/295; 362/394; 362/490; 362/375; 362/95; 362/395; 362/479; 200/549; 200/550
(58) Field of Search .................................... 362/295, 394, 362/490, 488, 375, 95, 395, 479; 200/549, 550

(56) References Cited

U.S. PATENT DOCUMENTS

| | | | |
|---|---|---|---|
| 5,051,549 | * | 9/1991 | Takano .................................... 200/16 |
| 5,775,798 | * | 7/1998 | Yamada et al. ...................... 362/226 |
| 5,951,149 | * | 8/1999 | Lee ........................................ 362/259 |
| 6,076,947 | * | 6/2000 | Miller .................................... 362/492 |

\* cited by examiner

Primary Examiner—Stephen Husar
Assistant Examiner—Anabel Ton
(74) Attorney, Agent, or Firm—Nixon & Vanderhye P.C.

(57) ABSTRACT

Automotive internal lights have a molded housing defining an elongate recess and bus bars which integrally include lamp holders secured within the molded housing and adapted to hold a lamp therebetween. The lamp holders have a base exposed to irradiate heat from said lamp. Connector terminals and an earth terminal are secured within said molded housing. The bus bars also integrally have spaced-apart fixed contacts secured within the molded housing so as to establish respective surfaces flush with the housing but exposed to said elongate recess. A slide switch is moveable longitudinally within the recess between at least first and second positions, and carries a generally U-shaped movable contact member which is adapted to contact the exposed surfaces of the fixed contacts so as to turn the lamp held by the lamp holder on and off, respectively. The housing includes notches formed in the recess opposite to the exposed surfaces of the fixed contacts. The slide switch includes a chamber, a ball accommodated within the chamber, and a spring extending between the moveable contact member and the ball. The spring thus urges the ball and moveable contact member away from each other and into forcible contact with the notches and the fixed contacts, respectively.

1 Claim, 5 Drawing Sheets

ND LIGHT

FIELD OF THE INVENTION

The present invention relates to an automotive light such as an automotive internal light which is adapted to be turned on and off by way of door open/close operations and which is capable of performing on-off controls by the operation of a slide switch, if necessary.

BACKGROUND AND SUMMARY OF THE INVENTION

Conventional automotive lights include lamp holders, connectors and fixed contacts composed of bus bars. The bus bars typically inserted into a groove formed in a housing so as to form a lamp operation circuit for purpose of turning the lame on and off.

Since the slide switch is combined with a movable contact which moves resiliently on the inserted fixed contacts, there exists the problem that the fixed contacts fail to withstand the urging force from the movable contact causing the fixed contacts to be displaced somewhat. This resultant displacement of the inserted fixed contacts caused by the movements of movable contacts is usually, however, prevented by securing a cover plate onto the portions where the fixed contacts are arranged. Furthermore, as shown in Japanese Pub. No. 8-258078, it is proposed that most of the bus bars used therein are fixed in a molding. However, there is no improvement proposed concerning the contacts on which the force from the slide switch is exerted most heavily.

Conventional automotive lights also have assembly problems since the operation to insert bus bars into grooves formed in the housing is too labor intensive and costly. There is also an impact on the integrity of the lights due to the relatively long time periods involved in shipping parts from parts factories and assembly plants and/or during the assembling process thereof into a car body which can cause the bus bars to slip out from the housing.

Further, since the fixed contacts which are part of the slide switch are fixed by means of a cover plate against the housing in order to secure the fixed contact against the resiliency of the movable contacts, the number of the parts involved increases such that even more manpower is needed thereby increasing the production costs.

SUMMARY OF THE INVENTION

The present invention is aimed at solving the above mentioned problems and its object is to provide an automotive light in which fixed contacts of the slide switch for on-off control of the lamp holders, the connector terminals, the earth terminals and the light is composed of bus bars which are buried in the housing, but a part thereof is exposed. As such, the bus bars are securely fixed in the housing due to the fixed contacts being buried in the molded housing except at those portions where the fixed contacts are in contact with the movable contacts. According to the present invention, there is therefore no need for a cover plate to secure the fixed contacts to ensure that the switching operation is stabilized with the fixed contacts.

In order to attain the objects noted above, the present invention includes, a molded housing, lamp holders secured within the molded housing, and a lamp held by the lamp holder. The connector and earth terminals are secured within the molded housing. A slide switch is provided to control on-off actions of the lamp. The slide switch includes bus bars secured within the molded housing and has fixed contacts secured in an exposed state. Movable contacts are adapted to slide on the fixed contacts and are operable with the slide switch. A lens plate is detachably attached to the housing.

DETAILED DESCRIPTION OF THE EMBODIMENT

Hereinafter, one mode of embodying the present invention relating to an automotive internal light will be explained with reference to the drawings.

Figure 5:
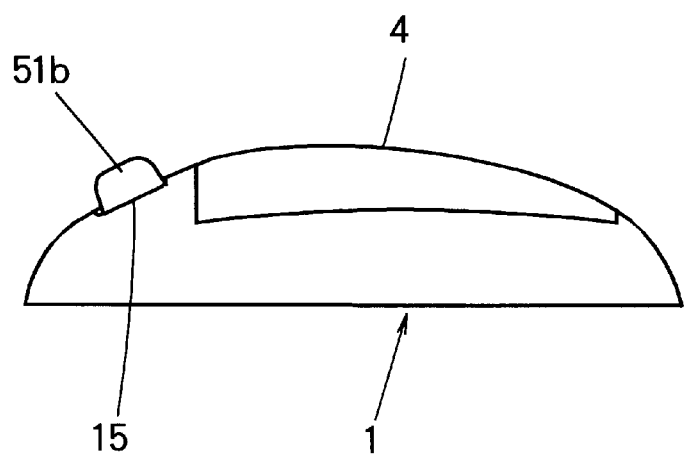
FIG. 5 is a lateral side elevation of the automotive light shown in FIG. 1 with the lens attached.
Figure 6:
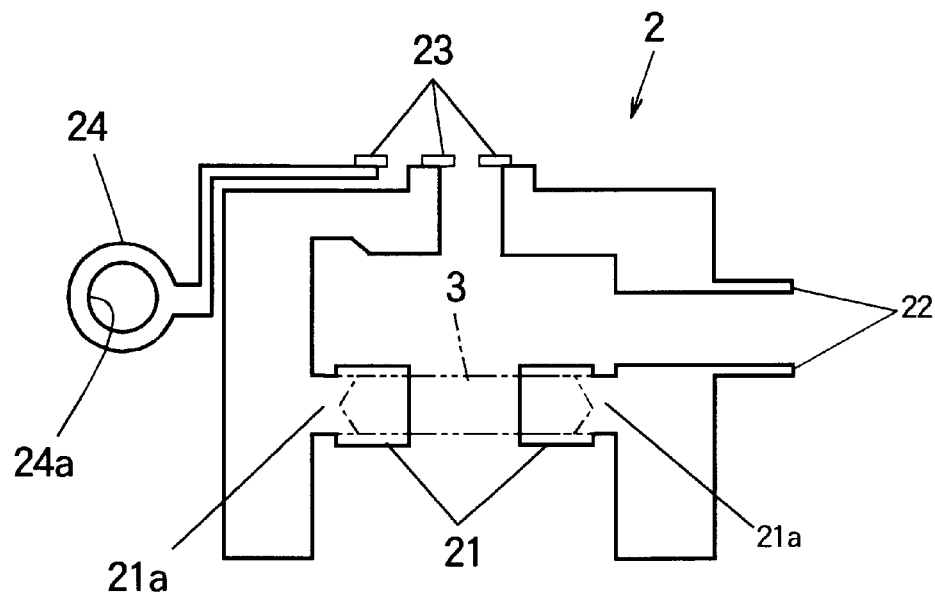
FIG. 6 is a plan view of the bus bars employed in the automotive light of the present invention.

Molded housing 1 includes lamp holders 21 to resiliently hold the lamp 3 therebetween. The lamp holders 21 extend from base portions 21 a thereof. The connector terminals 22; fixed contacts 23 forming a slide switch; and a ring-shaped earth terminal 24 (see FIG. 6) are all imbedded within the molded housing 1. The housing 1 has an upper opening 15 detachably attached with a lens plate 4 as shown in FIG. 5.

The fixed contacts 23 descend along a wall of a recess 14 to be explained later from the upper surface side thereof (or the side where the lens plate 4 is attached) and are fixed in the molded housing with only the surfaces (or the surfaces opposite the movable contacts 5, which will be explained later) of the fixed contacts 23 being exposed.

One corner of the housing 1 includes a screw hole 12 to allow attachment onto the roof of the vehicle. The corner diagonally opposite the screw hole 12, there is formed a screw hole 13 to communicate with the screw hole 24a in the earth terminal 24. A longitudinally extending recess 14 is also provided to accommodate movable contacts 5 to be explained later. One of the side walls of the recess 14 is formed with notches 14a composed of recesses and protuberances which cooperatively engage with the ball 54 of the movable contact 5.

Figure 1:
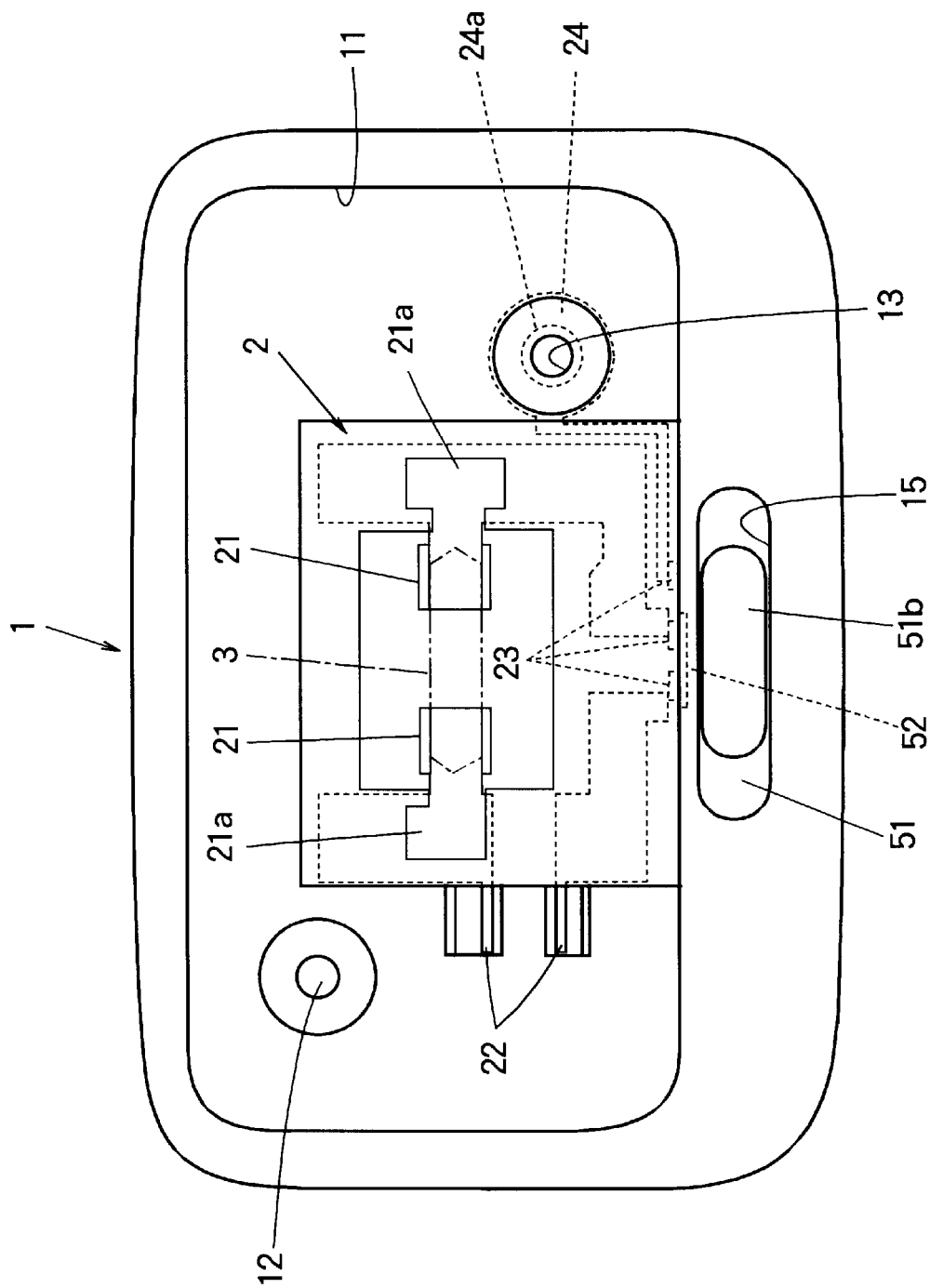
FIG. 1 is a top plan view of one embodiment of the present invention relating to an automotive light with the lens plate being removed.
Figure 2:
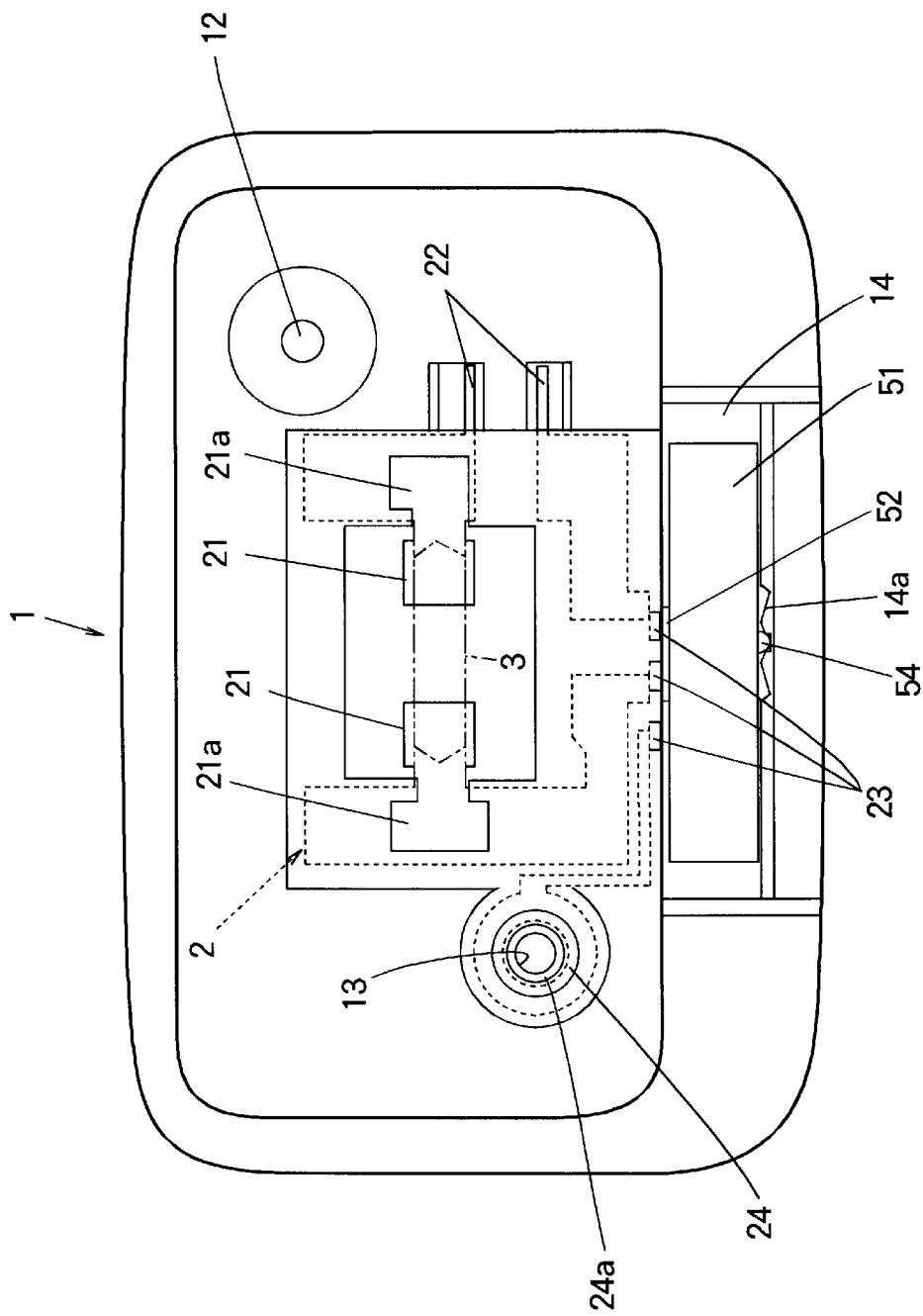
FIG. 2 is a bottom plan view of the embodiment depicted in FIG. 1.
Figure 3:
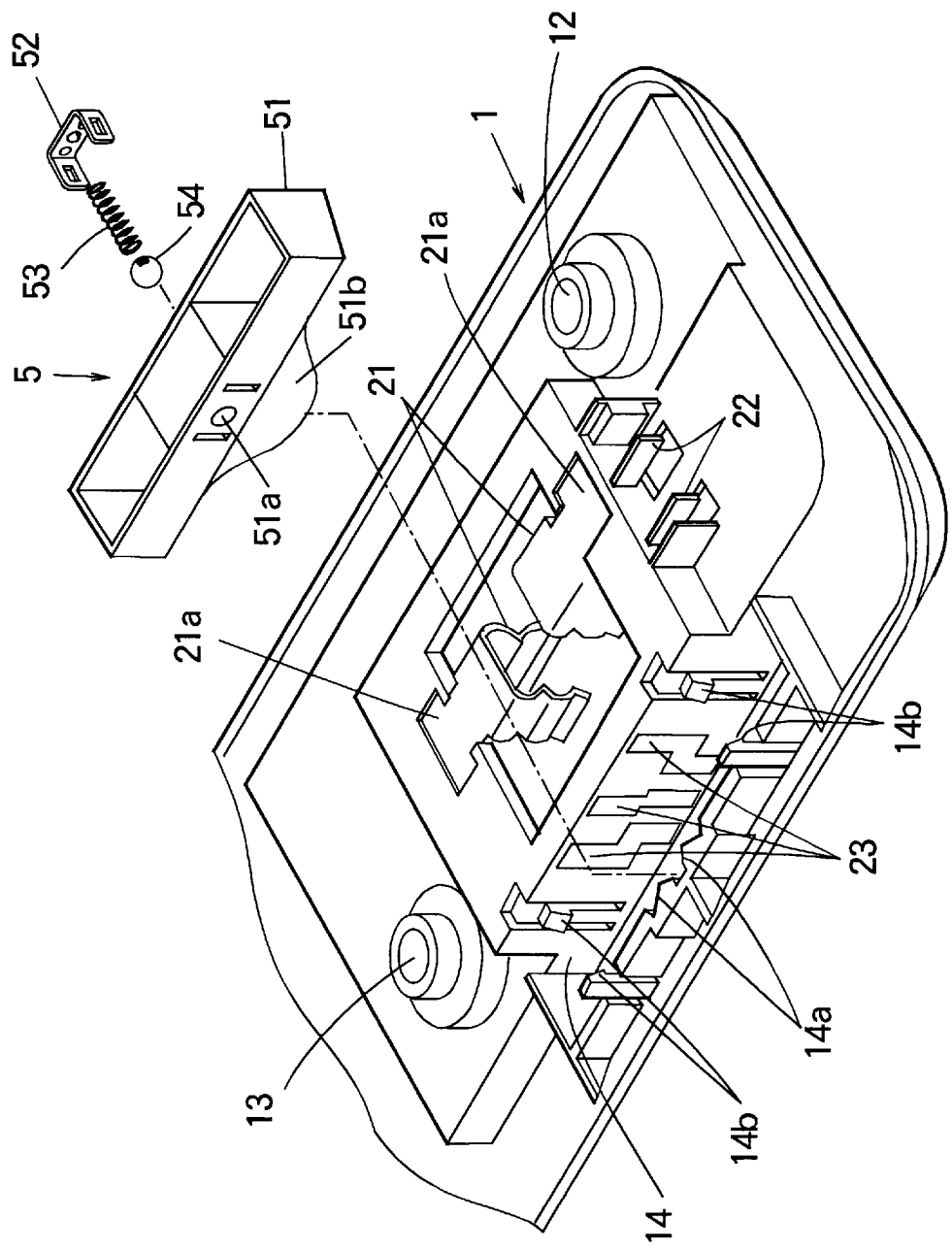
FIG. 3 is an exploded perspective bottom view of the embodiment depicted in FIG. 2.

The movable contact 5 is slidably accommodated within the recess 14 in the housing 1 as shown in FIG. 3. The slider 51 of the movable contact 5 is prevented from slipping out by means of pawls 14b. The spring 53 and the ball 54 are accommodated in the bore 51 a formed in the slider 51 centrally taken perpendicularly to the longitudinal direction.

The movable contacts 52 and the ball 54 are urged by the spring to repel each other, but each is prevented from slipping out. The movable contacts 52 move between two of the fixed contacts such that the ball 54 moves to short circuit between the two contacts at the lowermost positions of the notches. In such a manner, a clicking feel is given during the movement thereof.

Figure 4:
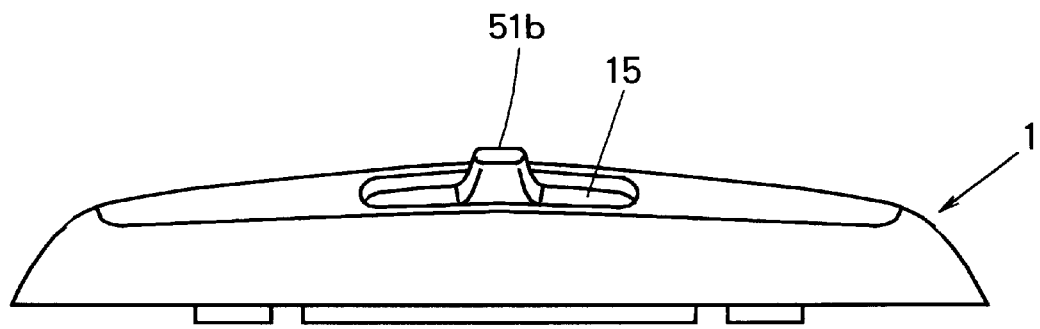
FIG. 4 is a longitudinal side elevation of the automotive light shown in FIG. 1 with the lens attached.

A chevron operation knob 51b is formed on the top surface side of the slider 51 and projects upwardly out of the slot 15 formed in the top side of the housing 1. Therefore, the movement of the operation knob 51b sideways in FIG. 4 by manipulating the slider 51 provides the switching between contacts with a clicking feel.

The circuit structure of the thus constructed automotive light will be explained with reference to FIG. 7. Similar characters and numerals denote similar members discussed previously.

Figure 7:
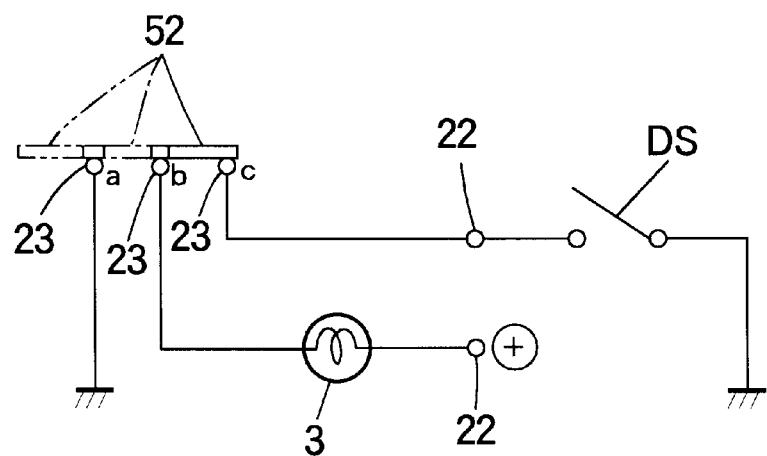
FIG. 7 is a view of the automotive light circuit.

FIG. 7 shows that the contact a of said fixed contacts 23 is grounded, the contact k is connected to the + terminal by way of the automotive battery terminal, the contact c. is grounded by way of the door switch DS (which is switched on by opening a door).

If the driver or the like opens the door switch DS by opening the door with the knob 51b of the slider 51 of the movable contacts 5 being slid until the movable contact 52 is set at a position shown in real line in this circuit (to short circuit the contacts b and c of the fixed contacts 23), the lamp 3 is lighted because a current flows from the contacts b. and ~. by way of the door switch DS until grounded.

On the other hand, the movable contact 52 of the slider 51 is slid to the position where the contacts a and b is closed, a current flows from the + terminal of the battery by way of the lamp 3 and the contacts b and a until grounded, thus lighting the lamp 3.

Further, if the slider 51 is slid to the position where the movable contact 52 is brought into contact with the contacts a, the door opening action will not light the lamp 3, which continued to keep the turned-off state in any circumstances.

The present invention is constructed such that the bus bars composed of the lamp holder, the connector terminal and the earth terminal and the fixed contacts of the slide switch for controlling turn-on-off operation of the lamp are exposed while secured in the housing, thus assuring the positive fixation of the bus bars within the housing.

Furthermore, by securing the fixed contacts within the housing such that said fixed contacts have exposed surfaces flush with said housing, the movable contacts are moved smoothly without generating sparks at the time of switching action of the contacts.

Additionally, by exposing the base of the lamp holder instead of burying in the housing, the heat in the lamp holder due to the heat of the lamp is irradiated from said base, thus preventing the entire automotive light from overheating.

Finally, since the movable contact is adapted to slide on the fixed contacts includes a slider having a chamber, a ball accommodated within the chamber together with the movable contact member, the ball being positioned opposite notches formed in said housing, a cost reduction effect can be achieved.

What is claimed is:

1. An automotive internal light comprising:

a molded housing defining an elongate recess;

bus bars which integrally includes lamp holders secured within said molded housing and adapted to hold a lamp therebetween, said lamp holders having a base exposed to irradiate heat from said lamp;

connector terminals secured within said molded housing;

an earth terminal secured within said molded housing;

said bus bars also integrally having spaced-apart fixed contacts having one portion which is embedded within said molded housing in such a manner so as to establish another portion of said bus bars which defines respective surfaces flush with said housing but exposed to said elongate recess;

a slide switch moveable longitudinally within said recess between at least first and second positions, said slide switch carrying a generally U-shaped movable contact member which is adapted to contact said exposed surfaces of said fixed contacts so as to turn the lamp held by the lamp holder on and off, respectively;

said housing including notches formed in said recess opposite to said exposed surfaces of said fixed contacts; and wherein said slide switch includes a chamber, a ball accommodated within said chamber, and a spring extending between said moveable contact member and said ball, said spring urging said ball and said moveable contact member away from each other and into forcible contact with said notches and said fixed contacts, respectively.

* * * * *